Jan. 18, 1938.                T. A. RICH                2,106,064
            LOAD INDICATOR FOR THREE-PHASE GENERATORS
                  Filed Dec. 12, 1935        2 Sheets-Sheet 1
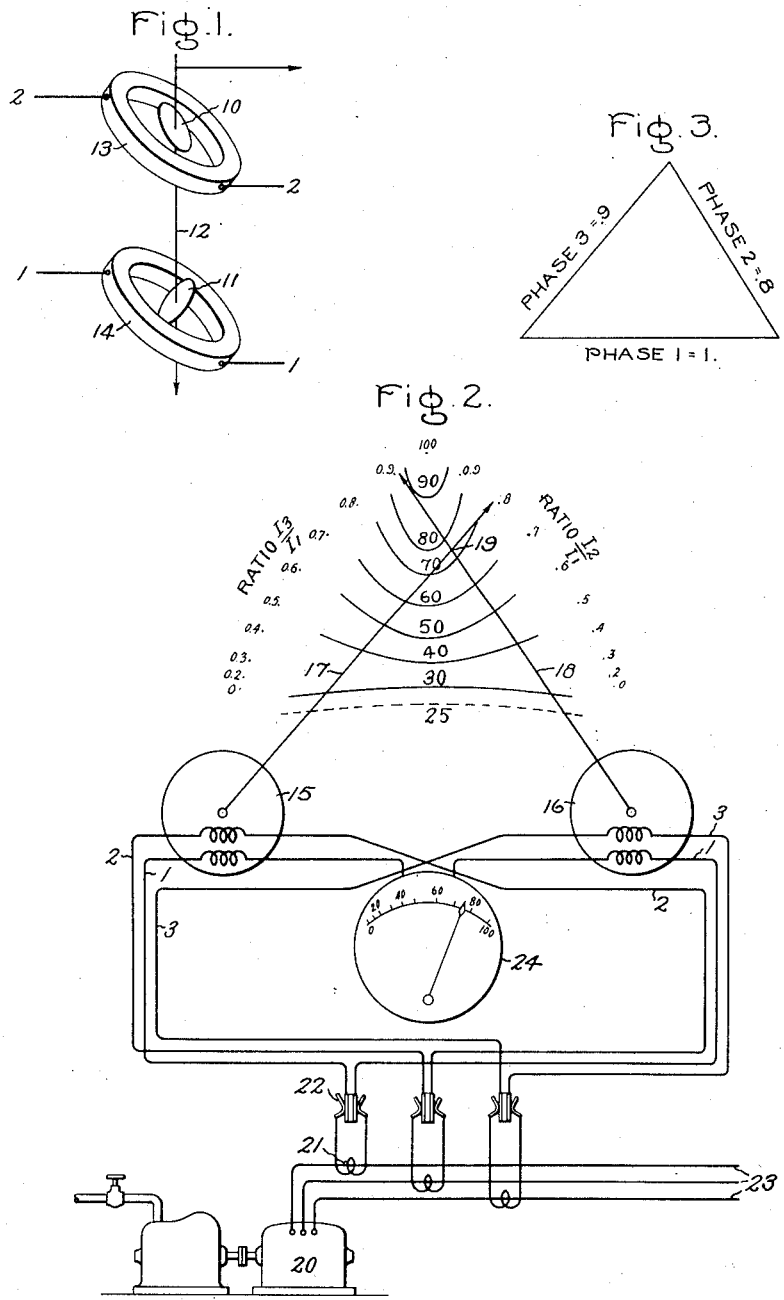
Inventor:
Theodore A. Rich,
by Harry E. Dunham
His Attorney Jan. 18, 1938. T. A. RICH 2,106,064
LOAD INDICATOR FOR THREE-PHASE GENERATORS
Filed Dec. 12, 1935   2 Sheets—Sheet 2
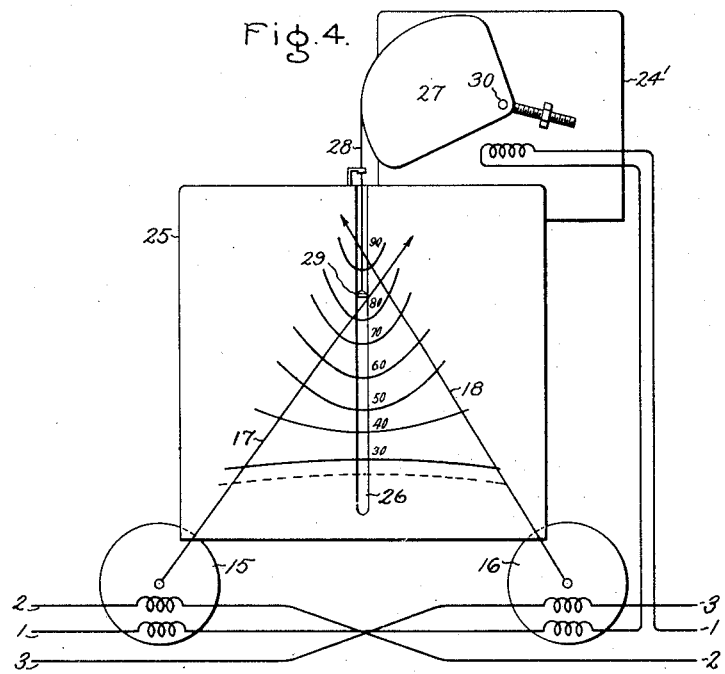
Inventor:
Theodore A. Rich,
by Harry E. Dunham
His Attorney.

Patented Jan. 18, 1938

2,106,064

UNITED STATES PATENT OFFICE 2,106,064

LOAD INDICATOR FOR THREE-PHASE GENERATORS

Theodore A. Rich, Schenectady, N. Y., assignor to General Electric Company, a corporation of New York Application December 12, 1935, Serial No. 54,075

6 Claims. (Cl. 172—245)

My invention relates to measuring apparatus for producing an indication of the safe load that may be carried by three phase electrical apparatus, such as a three phase generator, which measuring apparatus takes into consideration the extent to which the phases of the apparatus are unbalanced, and its object is to provide relatively simple, inexpensive and reliable apparatus for this purpose.

In general the current load which any three phase electrical apparatus may carry with safety is in proportion to the degree of current phase balance of such apparatus. In order that such apparatus may be operated at or close to its maximum safe load and to prevent exceeding such load, it is desirable to provide maximum safe load indicating apparatus which takes into consideration the phase balance condition thereof.

The present invention makes such measuring apparatus available in a simple and usable form.

In carrying my invention into effect, I provide a pair of ratio measuring instruments which cooperate to produce a maximum safe load indication pertaining to the system or apparatus with which the ratio instruments are connected, the ratio instruments being connected to measure the ratio relationship of currents flowing in different phases of the system. The apparatus in its simplest form makes use of the fact that, designating the magnitude of the currents flowing in the three phases by $a$, $b$ and $c$, if the ratio of $$\frac{a}{b}$$

and $$\frac{a}{c}$$

are measured, the ratio of $$\frac{b}{c}$$

is readily determined from the two first-mentioned ratio measurements and the relative values of the three currents become known. Then, if the two ratio instruments are so positioned that the pointers which measure the ratios swing in parallel planes and cross each other on a chart during such measurements, the crossing point of the pointers has a definite significance with respect to the condition of balance of the currents in the three phases.

The magnitude of the current for any indicated phase balance condition can be determined by measuring the current in one of the phases. Knowing the phase balance condition and phase current magnitude, the safe current load that may be carried for any given type of machine is readily determined and a chart of safe load values may be provided on the instrument on which the crossing point of the ratio instruments indicates safe maximum load for the indicated phase balance condition.

The features of my invention which are believed to be novel and patentable will be pointed out in the claims appended hereto. For a better understanding of my invention, reference is made in the following description to the accompanying drawings in which Fig. 1 illustrates a preferred type of ratio instrument that may be used; Fig. 2 illustrates the pointer and scale arrangement of a maximum safe load indicator in accordance with my invention; Fig. 3 shows the vector triangle corresponding to the phase balance condition indicated in Fig. 2; Fig. 4 illustrates a modified form of maximum safe load indicator where the ammeter for measuring the phase current indicates directly on the phase balance condition and load scale, and Fig. 5 shows the scheme when arranged to eliminate the effect of a residual current, such as might be present in a grounded neutral system.

Referring to Fig. 1, I have here represented one of the two current ratio instruments which I prefer to employ in my invention. Since both of such instruments will be similar, one only is described in detail.

This ratio instrument comprises two Thompson inclined vane ammeters with the iron vanes 10 and 11 on the same shaft 12 and disposed in inclined planes at an angle with respect to each other and 45 degrees to the shaft 12. The stationary coils 13 and 14 of the two instruments are parallel to each other, but inclined in planes at a 45 degree angle to the shaft 12. Such a device seeks to turn the shaft into a position where the opposing torques of the two ammeters are balanced and the deflection, therefore, depends on the ratio of the currents flowing through the two coils. If the upper coil carries the current of phase 2 designated $I_2$ and the lower coil carries the current of phase 1 designated $I_1$, the scale may be calibrated in the ratio $$\frac{I_2}{I_1}$$

Other forms of ratio instruments which will produce the desired measurement may be used, but ratio instruments which give a large deflection are to be preferred.

In Fig. 2, 15 and 16 represent two such ratio instruments as described above. Instrument 15 is connected to measure the ratio $$\frac{I_2}{I_1}$$

of the three phase circuit 23, the different current phases of which are designated 1, 2 and 3. Instrument 16 is connected to measure the ratio $$\frac{I_3}{I_1}$$

of the same circuit. The two instruments are so relatively positioned that when the ratios $$\frac{I_2}{I_1} \text{ and } \frac{I_3}{I_1}$$

are near unity or below, the pointers 17 and 18 of the two instruments cross each other and when these ratios are equal the crossing point of the pointers is preferably equally distant from both pivot points and this distance decreases as the measured ratios decrease in value. The deflection constants of the two ratio instruments are thus similar but opposite and, while this specific arrangement is not essential, it is to be preferred for the sake of symmetry and compactness. The ratio scales for the two instruments are marked adjacent their pointer ends and since, as will be explained, ratio measurements of $$\frac{I_3}{I_1} \text{ and } \frac{I_2}{I_1}$$

materially greater than unity are not required in the manner in which the instrument is to be used the ratio scales are not carried above unity.

It will now be evident that with the apparatus as thus arranged the crossing point of the pointers for any given set of ratio measurements signifies a definite phase balance condition of the currents $I_1$, $I_2$ and $I_3$ flowing in the phases 1, 2 and 3. Thus, if the pointers crossed with both ratio instruments reading unity, we would know that the currents were equally balanced. As represented in Fig. 2 the pointers cross at point 19 when ratio $$\frac{I_2}{I_1} \text{ is .8 and ratio } \frac{I_3}{I_1} \text{ is .9}$$

and it is immediately apparent that the current magnitudes in phases 1, 2 and 3 are in the relation of 1, .8 and .9 respectively. We may draw the vector triangle of this condition as shown in Fig. 3. We may measure the phase angles and we may derive the positive and negative phase sequence currents corresponding to this condition if we so desire.

In short the point 19 on the chart beneath the pointers is significant of a particular known phase balance condition and likewise all other points on the chart are significant of different known phase balance conditions when the ratio measurements are such as to cause the crossing point of the pointers to designate such other points.

To illustrate a practicable example of the use of my invention, I have shown the measuring apparatus of Fig. 2 connected to measure the current phase balance condition of a three phase turbo-alternator represented at 20 which is assumed to be supplying a load not shown over the load lines 23. Current transformers 21 having suitable disconnecting jacks 22 in the secondary leads thereof supply the measuring apparatus in accordance with the line currents of the turbo-alternator. The measuring apparatus will therefore be calibrated with a safe maximum current load chart for the turbo-alternator in question.

An ammeter 24 is connected in phase 1 of the current measuring circuit which is common to both ratio instruments and in the line that usually carries the maximum current. If the balance shifts so that some other line carries the greatest current, this is indicated by the indication of a ratio instrument moving off the upper end of its scale and if this condition is such as to make correct readings, difficult, the appropriate ammeter jacks at 22 are interchanged so as to cause the maximum current to flow in the line designated 1 common to both ratio meters and through ammeter 24. It will be noted that from the ammeter reading in line 1 we can immediately compute the currents in lines 2 and 3 from the current ratio readings.

In order to simplify the explanation I will assume that the turbo-alternator has a full load current rating when the current is balanced at 100 amperes per line terminal. This means that the machine has been designed to carry a balance load current of 100 amperes per line phase indefinitely without overheating. Now it might be supposed that such a machine would safely carry an unbalanced load indefinitely if the current in the heaviest loaded phase was maintained at, but did not exceed 100 amperes. Such an assumption is decidedly erroneous. An unbalance current condition causes the flow of what is known as negative phase sequence currents. For a more complete discussion of negative phase sequence currents and the manner of their derivation from a known condition of phase unbalance, see Chapter XII of "Principles of Alternating Current" by Ralph R. Lawrence, first edition, fifth impression.

In three phase machines of the turbo-alternator type, the heating which is produced by the negative phase sequence current may be six times as much as the same average line current would produce and as a consequence when the current becomes unbalanced in such a machine it is essential for its safe operation to reduce the line current thereof from the balanced rated line current by an amount which depends upon the degree of unbalance.

The maximum safe load current that may be carried by such a machine under any given condition of phase unbalance may be determined by operating the machine under that particular phase unbalance condition and increasing the load current until the maximum heat rise, as determined by thermometers, reaches the maximum safe value. For example, in Fig. 2 we may thus determine the safe current in line 1 for the phase balance condition indicated and find that it is 75 amperes. The current in phase 2 is then .8 of 75 or 60 amperes and in phase 3 .9 of 75 or 67.5 amperes. Similarly we may determine the maximum safe line current in the heaviest loaded phase for other conditions of phase unbalance, until finally we have a sufficient number of points on the chart determined so that we may draw a line 70 through all of the points on the chart that corresponds to the maximum safe current in phase 1 of 70 amperes for various different conditions of phase unbalance, another line 80 through all of the points corresponding to the maximum safe current in phase 1 of 80 amperes for various different conditions of phase unbalance and so on, until we have the chart calibrated as represented in Fig. 2. Another way to make up such a chart of the maximum safe load current in the heaviest loaded phase of a particular type of machine is by calculation. That is, designing engineers knowing the type of machine, may calculate the heat losses therein, the rate of heat dissipation therefrom and arrive at the temperature rise therein at the hottest point for all possible conditions of phase unbalance with a reasonable degree of accuracy, and thus determine the phase current values beyond which it would be unsafe to go for various different conditions of phase unbalance.

From experience and from checking the results of calculations by heat runs, these values have been and may be reliably determined so that such charts of maximum safe load current in the heaviest loaded phase for different conditions of phase unbalance may be made for different types of machines. The chart represented in Fig. 2 is for the turbo-alternator type of machine and in general the chart for all efficiently designed turbo-alternators will be the same.

It will be noted from the chart of Fig. 2 that as a balanced phase condition is approached it is safe to approach full rated current in line 1, the heaviest loaded conductor and that the maximum safe load current in the heaviest loaded conductor decreases very materially from the maximum rating of 100 amperes as the phases become more and more unbalanced.

Where the pointers cross at point 19 corresponding to $$\frac{I_2}{I_1}=.8 \text{ and } \frac{I_3}{I_1}=.9$$

the maximum safe load current of phase I as indicated by ammeter 24 is 75 amperes and if the ammeter exceeds this reading it is necessary for the safety of the machine for the operator to reduce the load immediately or balance the load. If the condition of phase balance were $$\frac{I_2}{I_1}=.5 \text{ and } \frac{I_3}{I_1} \text{ were } .9$$

the pointers would cross at a point indicating the safe maximum load current as indicated by ammeter 24 to be 40 amperes. If pointer 17 moves off the chart as when $$\frac{I_2}{I_1}$$

increases above unity the operator should interchange the ammeter jacks 22 in phases 1 and 2 so as to keep maximum current in the phase common to both ratio instruments and ammeter 24. The ammeter 24 and the chart of maximum safe load current may be calibrated directly in amperes or in per cent of the maximum current load rating. Here where the maximum current load rating was assumed to be 100 amperes, these scales are calibrated both in per cent and in amperes. The ratio scales are not required after the maximum safe load current lines or graduations have been plotted for a given disposition of the ratio instruments and hence need not necessarily appear on the finished instrument. The station operator, who makes use of this instrument to maintain safe operating conditions of the machine for which he is responsible, does not have the training, information or time to otherwise determine maximum safe current that may be carried by a given machine under an unbalance phase condition and hence the instrument here described, which gives the operator this information in the form of a direct continuous indication, is of considerable value to the operator in enabling him to get the most out of his machine with safety.

In Fig. 4 I have shown a modification where the ratio instruments and the maximum load ammeter indicate directly on the same maximum load scale. In this modification the disposition and connection of the ratio instruments is the same as in Fig. 2. The chart 25 on which the scales are marked has a vertical depression or slot 26 through its center. The maximum phase current ammeter 24' has a balanced cam 27 on its shaft 30 instead of or in addition to a pointer and resting in a groove in the periphery of this cam is a silk thread or the like 28. The thread hangs down and is guided in the slot 26 and carries a small weighted indicator 29 at its end in the slot 26. The shape of the cam 27 and deflection characteristics of the ammeter are made such that the indicator 29 correctly cooperates with the maximum load current scale on chart 25 to indicate thereon the current flowing in phase I. At the same time the crossing point of the pointers 17 and 18 indicates on the same scale of chart 25 the maximum permissible current that may be carried in phase I under any condition of phase balance. The operator observing this chart maintains his maximum phase current indication as given by indicator 29 so as not to exceed the indication of safe load current as given by the crossing point of the pointers 17 and 18.

The foregoing description assumes that all of the current flowing in the machine to which the safe load indicator is connected flows in and out of its three line terminals. This is usually true, but in some cases three phase machines have a grounded neutral with a fourth or neutral wire in which a residual current may flow such that the three phase vector diagram of line currents does not form a closed triangle.

In any case where a residual or neutral current is apt to exist the apparatus described will not necessarily give correct readings, and it is desirable in such cases to provide an arrangement which will eliminate the effect of the neutral current since the heating effect of the neutral current is small compared to the heating effect of the negative phase sequence related to phase unbalance.

A safe load indicating instrument for grounded neutral systems in which a residual current may flow is shown in Fig. 5. The heating effect of the residual current is usually negligible. However, it would not have a negligible effect on the ratio measurements if attempted by the apparatus of Fig. 2 and it is, therefore, necessary to eliminate the effect of any residual current in making the ratio measurements and comparable ammeter reading in the high current phase.

In Fig. 5 each instrument element of the apparatus has two coils instead of one as in Fig. 3. Thus one ratio meter has an inclined coil iron vane ammeter element having two coils 31 and 32 and a second inclined coil iron vane ammeter element having two coils 33 and 34. The other ratio meter likewise uses double coil ammeters, the coils being designated by reference characters 35 and 36 for the top element and by 37 and 38 for the bottom element. The comparison ammeter 44 likewise has two coils 39 and 40. In all of these ammeter elements it is assumed that the two coils thereof are reversely wound, the upper coils in each case being wound in one direction and the bottom coils in the opposite direction for the circuit connections shown. The apparatus is connected to receive the line currents of a grounded neutral generator 41 through current transformers 21 and jacks 22, whereby the connections may be interchanged as desired.

According to the connections shown and the direction of winding the ammeter coils explained above, the upper ammeter of each ratio meter and the comparison ammeter 44 will tend to measure the vector difference of the currents in lines 1 and 2 or, briefly, $I_1—I_2$ since these ammeters are connected in series in current lines 1 and 2. The lower ammeter of the ratio meter on the left is connected to produce a torque according to $I_2—I_3$ while the lower ammeter of the ratio meter on the right is connected to produce a torque according to $I_3—I_1$. The ratio meter on the left will thus measure the ratio $$\frac{I_1—I_2}{I_2—I_3}$$

while the other ratio meter will measure the ratio $$\frac{I_1—I_2}{I_3—I_1}$$

Now it can be demonstrated that by thus vectorially subtracting the currents in rotation the effect of any residual or neutral current that may be flowing in the system is eliminated and that the apparatus may be used in the same way as that of Fig. 3 to produce a safe load indication in terms $I_1—I_2$ which is what ammeter 44 measures. When the vector ratios $$\frac{I_1—I_2}{I_2—I_3} \text{ and } \frac{I_1—I_2}{I_3—I_1}$$

are unity the phases, less the effect of any residual current, are balanced and the pointers of the ratio meters are set so their ends meet at point P and for decreasing ratio measurements pointer 17 deflects to the right and pointer 18 to the left of this point. As thus arranged when the pointers cross on the chart within the ratio scales, the ammeter 44 measures the maximum vector difference $I_1—I_2$ which is common to both ratio measurements. Should the conditions change to bring the intersection of the line of the pointers off the chart, the jacks at 22 should be shifted to bring the ratio measurement back on the chart again. Maximum safe load values in terms of the ammeter reading $I_1—I_2$ can be arrived at by heat runs or can be calculated for a given machine for various ratio measurements and crossing points of the pointers and the chart graduated accordingly. The indication given shows that the maximum safe load that may be carried on machine 41 is that which causes ammeter 44 to reach about 89 when the condition of load balance is that shown by the ratio meters. The ammeter 44 may be arranged to indicate directly on the safe load chart as explained in connection with Fig. 4 if that is desirable.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. Safe current load measuring apparatus for three-phase systems comprising a pair of ratio meters, each ratio meter comprising a pair of ammeters, the movable elements of which are mounted on a common shaft to produce opposing torques, a fifth ammeter connected in series relation with one ammeter of each ratio meter, said ratio meters being connected to measure different ratios pertaining to the current relations in the three phases of the system under investigation such that, under an unbalanced current condition of said system, the torques of those ammeters of the ratio meters which are connected in series with the fifth ammeter predominate over the torques of the other ammeters of said ratio meters, pointers for said ratio meters which swing in parallel planes in response to the ratio measurements of such meters and cross each other, and a chart on which the crossing point of said pointers is indicated, said chart being so graduated that the crossing point of said pointers indicates thereon the maximum safe measurement indication that may appear on the fifth ammeter when the current balance condition of said system is such as to produce ratio measurements corresponding to the positions of said pointers.

2. In combination, a three-phase alternating-current generator together with apparatus for producing an indication of the maximum safe current loading permissible for said generator when the currents in the different phases thereof are unbalanced comprising, a pair of ratio meters having indicating pointers which swing in closely adjacent parallel planes and cross each other in response to the measurements produced by such meters, a chart over which said pointers swing and on which there are a series of current-loading graduation lines with which the crossing point of the pointers cooperates to produce the desired indication, said ratio instruments being connected to measure different ratios pertaining to the phase currents of said generator, the combined measurements being influenced by the currents in all of the phases so that any given crossing point of the pointers corresponds to one and only one current phase balance relation, the current loading graduation lines of the chart being plotted from data determined from the heating characteristics of the generator for different values of current and conditions of current unbalance, and an ammeter for measuring current conditions common to both ratio meters and with which the chart indications may be compared to determine the condition of safety of the generator.

3. Safe current load measuring apparatus for a three-phase system, the phase currents of which may be designated $I_1$, $I_2$, and $I_3$, respectively, a ratio meter for measuring the ratio $I_2/I_1$, a second ratio meter for measuring the ratio $I_3/I_1$, indicating pointers for said ratio meters which swing in parallel planes and cross each other when the ratio measurements do not exceed unity, an ammeter for measuring the phase $I_1$ current, and a chart graduated in terms of the phase $I_1$ current as measured by said ammeter on which chart the crossing point of said pointers indicates the maximum safe phase $I_1$ current load that may be carried by the system.

4. In combination, a three-phase alternating-current generator together with apparatus for indicating the maximum current that may be carried with safety in the heaviest loaded phase of said generator for various different conditions of phase current unbalance thereof comprising, a pair of ratio meters respectively connected to measure the ratios $I_2/I_1$ and $I_3/I_1$ where $I_1$ represents the current in the heaviest loaded phase and $I_2$ and $I_3$ represent the current in the other two phases, respectively, said ratio meters having pointers which swing in parallel planes and cross each other during such measurements, and a chart over which said pointers swing graduated with respect to the heating characteristics of the generator to indicate with reference to the crossing point of the pointers the maximum safe current values that may be carried in the heaviest loaded phase of said machine for various different conditions of phase unbalance.

5. Safe current load measuring apparatus for three-phase systems, the phase currents of which may be designated $I_1$, $I_2$ and $I_3$, respectively, a ratio meter for measuring the ratio $I_2/I_1$, a ratio meter for measuring the ratio $I_3/I_1$, indicating pointers for said meters which swing in parallel planes and cross each other when the ratio measurements do not exceed unity, an ammeter for measuring the phase $I_1$ current, and a chart graduated in terms of the phase $I_1$ current as measured by said ammeter on which the crossing point of said pointers indicates the maximum safe phase $I_1$ current load of the system corresponding to the ratio measurement positions of said pointers and on which the ammeter indicates the phase $I_1$ current.

6. A safe current load measuring apparatus for three-phase systems, the phase currents of which may be designated $I_1$, $I_2$, and $I_3$, a ratio meter for measuring the vectorial ratio of $$\frac{I_1-I_2}{I_2-I_3}$$

a second ratio meter for measuring the vectorial ratio of $$\frac{I_1-I_2}{I_3-I_1}$$

indicating pointers for said ratio meters which swing in parallel planes and cross each other when the measured ratios do not exceed unity, an ammeter for measuring the vector quantity $I_1-I_2$, and a chart graduated in the same units as said ammeter on which the crossing point of said pointers indicates the maximum safe indication that may appear on said ammeter for the corresponding ratio measurements and positions of said pointers.

THEODORE A. RICH.